United States Patent [19]

Huffman et al.

[11] Patent Number: 4,581,741

[45] Date of Patent: Apr. 8, 1986

[54] ERROR DETECTION APPARATUS FOR DATA DEPENDENT CODING CIRCUITRY

[75] Inventors: Charles E. Huffman, Plano; Richard L. Majefski, Richardson, both of Tex.

[73] Assignee: Rockwell International Corporation, El Segundo, Calif.

[21] Appl. No.: 559,071

[22] Filed: Dec. 7, 1983

[51] Int. Cl.[4] .............................................. H03K 5/26
[52] U.S. Cl. ........................................ 371/67; 371/57
[58] Field of Search .................... 371/67, 71, 57, 65; 455/608; 375/22, 19, 55, 37; 178/69 D

[56] References Cited

U.S. PATENT DOCUMENTS

| | | | |
|---|---|---|---|
| 3,825,892 | 7/1974 | Catchpole | 371/57 |
| 3,889,235 | 6/1975 | Assmus et al. | 371/67 |
| 3,976,972 | 8/1976 | Aman | 371/57 |
| 4,032,885 | 6/1977 | Roth | 371/67 |
| 4,205,302 | 5/1980 | Godo | 371/67 |
| 4,502,143 | 2/1985 | Kato et al. | 371/57 |

Primary Examiner—Michael R. Fleming
Attorney, Agent, or Firm—Bruce C. Lutz; V. L. Sewell; H. Fredrick Hamann

[57] ABSTRACT

The present invention provides error checking for data dependent coding circuitry which checking is complicated by a considerable amount of circuitry which is activated only when the incoming data conforms to specific requirements (i.e., three or more consecutive logic zeros). Except for these occurrences, the output from the coding circuitry is straightforward representation of the nonreturn to zero input data. The present invention uses a straightforward detecting circuit to normally pass the data and a data compare circuit which compares the output of the detector with the output of the data dependent circuitry except for times when the specific condition of three consecutive logic zeros occurs. At that time, the data compare circuitry checks to make sure that both the code detector and the encoding circuit have detected the occurrence of this condition. Since the encoding circuitry has been working up to that time, it may be properly assumed that all of the circuitry is working properly and no error code is generated until either the straightforward data compare or the special condition detection fails to compare.

5 Claims, 9 Drawing Figures

ERROR DETECTION APPARATUS FOR DATA DEPENDENT CODING CIRCUITRY

THE INVENTION

The present invention is generally concerned with encoded data and more specifically with simple circuitry for checking to make sure that data encoding circuitry is performing properly.

BACKGROUND

In designing transmission equipment, the lines that carry data to and from certain pieces of equipment normally contain coding which generates specific line statistics. The coded data on these lines provides energy for the clock extraction circuits while keeping a zero DC offset in the line. A prior art solution has been to take the output from the encoding circuitry and "reverse engineer" the encoding in a line decode circuit and compare the output of the line decode circuit with a time delayed version of the input data. Whenever this decoded signal does not compare with the input, an error signal is generated. However, the line decode circuit requires a considerable amount of circuitry and it becomes very expensive to accomplish this function both in terms of cost of materials and the space required in the circuitry to provide this function. As will be realized by those skilled in the art, the decoding circuitry is typically more complicated than the original encoding circuitry.

A further possible approach to providing the error checking is to duplicate the encoding circuitry and then use a code synchronizer to synchronize the two encoding circuits. The code synchronizer is required because the encoding is dependent upon the polarity of the last pulse violating the bipolar rule utilized in the algorithm involved. In this approach to solving the problem, the code synchronizer is much more complicated than the remaining circuitry and is as undesirable an approach as the prior art solution mentioned above.

The circuitry used for detecting the specific condition of three consecutive logic zeros in the incoming signal is fairly simple. Also, the circuitry for changing the incoming NRZ (nonreturn to zero) data to bipolar data is very simple. The basis of the present invention, therefore, is to use a data comparison circuit for normally checking the logic values of the bipolar data except when the situation detected is the occurrence of three consecutive logic zeros. When this situation is detected, the data compare circuitry stops comparing data bits and instead compares whether or not both the encoding circuitry and the error checking or line detector circuit have both detected the condition simultaneously. If such simultaneous detection occurs, and the data previously output by the encoding circuit had been performing correctly up to that time, it is reasonable to assume that in the situation where the bipolar data is passed through all of the encoding circuit except for switched drivers at the very output, that the encoding circuity was operating correctly.

It is thus an object of the present invention to provide a more compact, low power circuit for checking the operation of an encoding circuit.

Other objects and advantages of the present invention may be ascertained from a reading of the specification and appended claims in conjunction with the drawings wherein:

Figure 3:
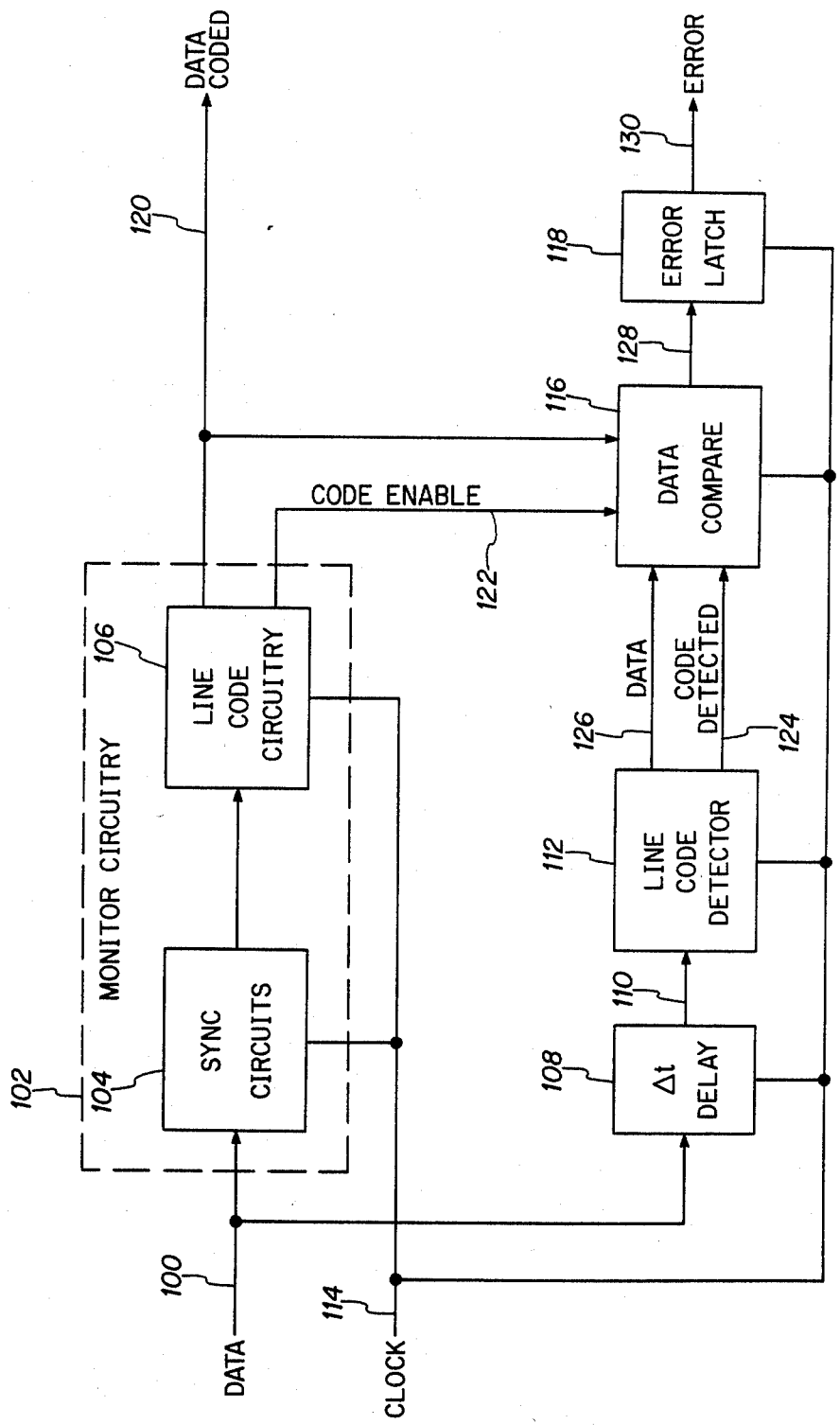
FIG. 3 is a functional block diagram of the inventive concept presented in this application.
Figure 4:
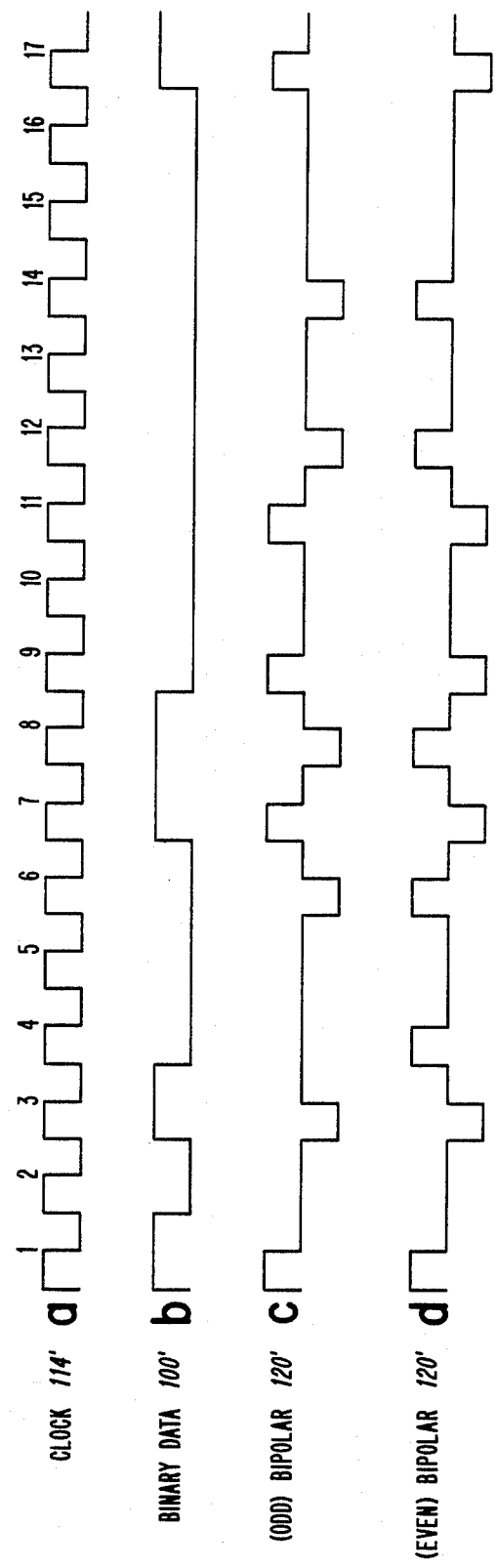
Figure 5:
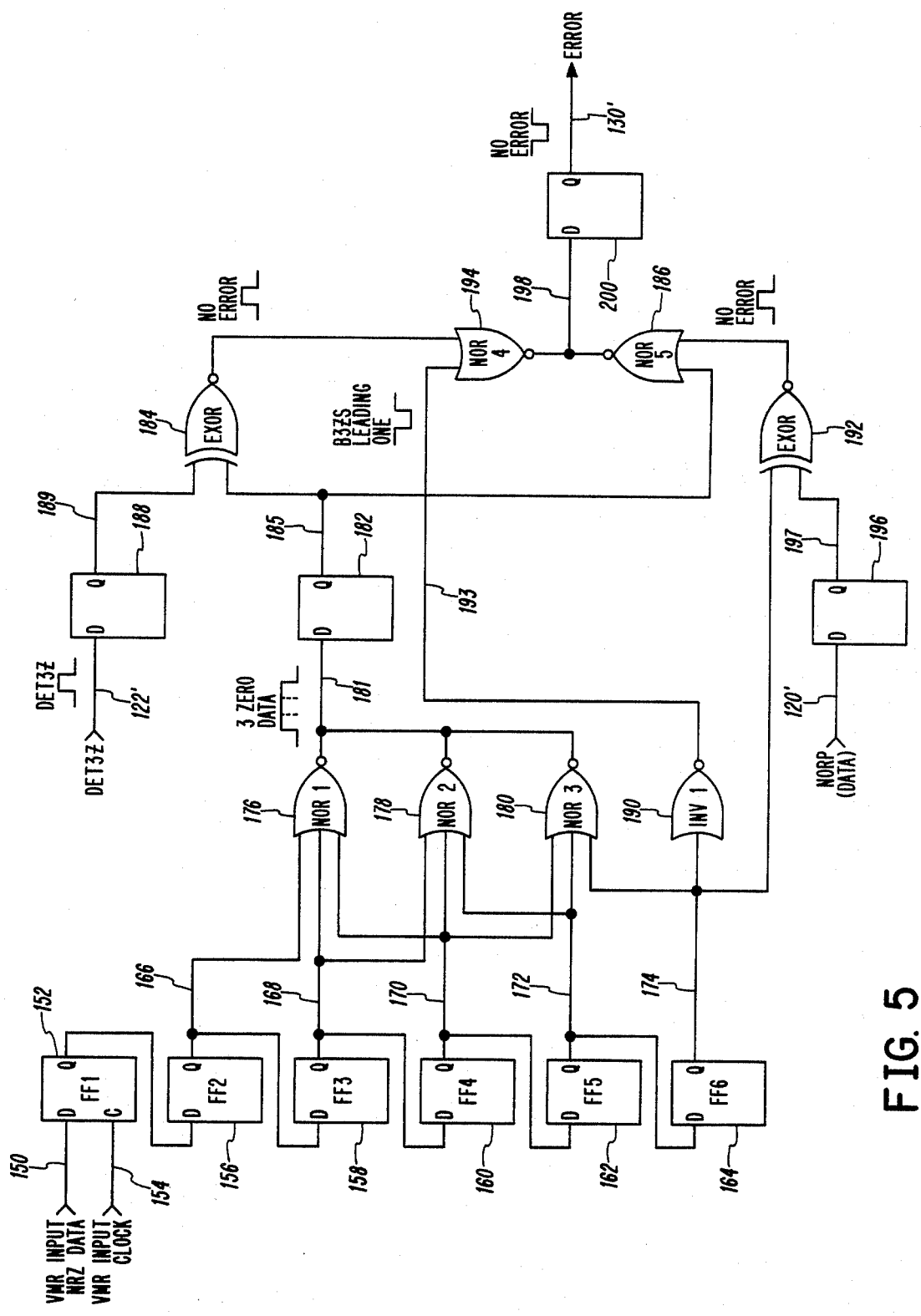

FIG. 4 *a-d* contains a plurality of waveforms used in explaining the inventive concept;

FIG. 5 is a detailed block diagram illustrating the line code detector circuitry of FIG. 3; and FIGS. 6-9 are a set of waveforms used in explaining the operation of FIG. 5.

DETAILED DESCRIPTION

Figure 1:
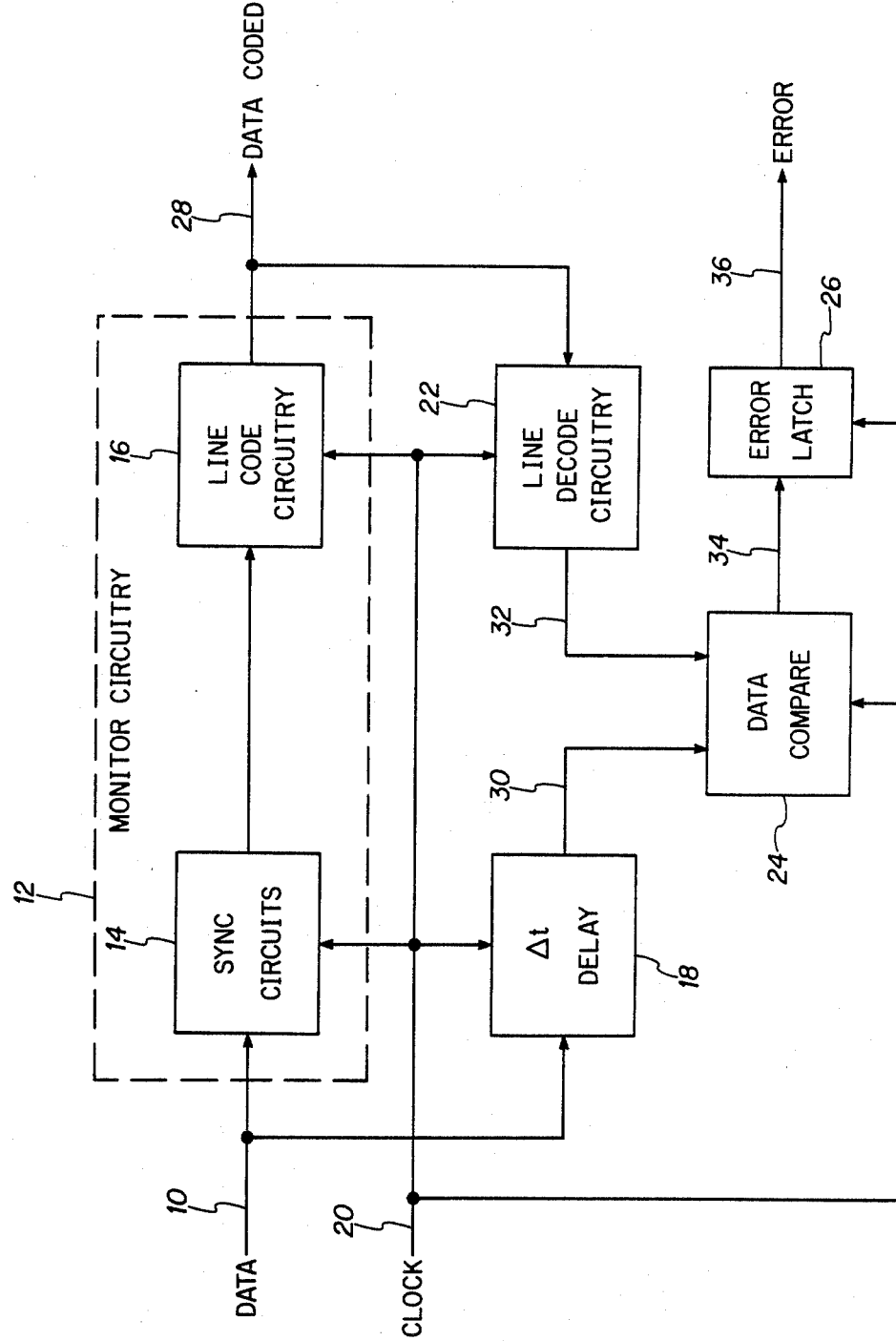
FIG. 1 is a functional block diagram of a prior art circuit.

In FIG. 1 a data line 10 supplies data to a dash line block 12 containing a sync circuit block 14 and a line decode circuit block 16. The data line 10 also supplies signals to a delta t delay block 18. A clock signal supplied on lead 20 is supplied to the blocks 14, 16 and 18 as well as being supplied to a line decode circuit block 22, a data compare block 24 and an error latch block 26. The output of the line code circuitry block 16 is supplied to an apparatus data output line 28 having coded (encoded) data. This data is also fed back to the line decode block 22. Outputs of blocks 18 and 22 are designated as 30 and 32, respectively, and are both supplied to the data compare block 24. An error detection signal from block 24 is supplied on lead 34 to error latch 26 which locks the error output signal onto a lead 36.

Figure 2:
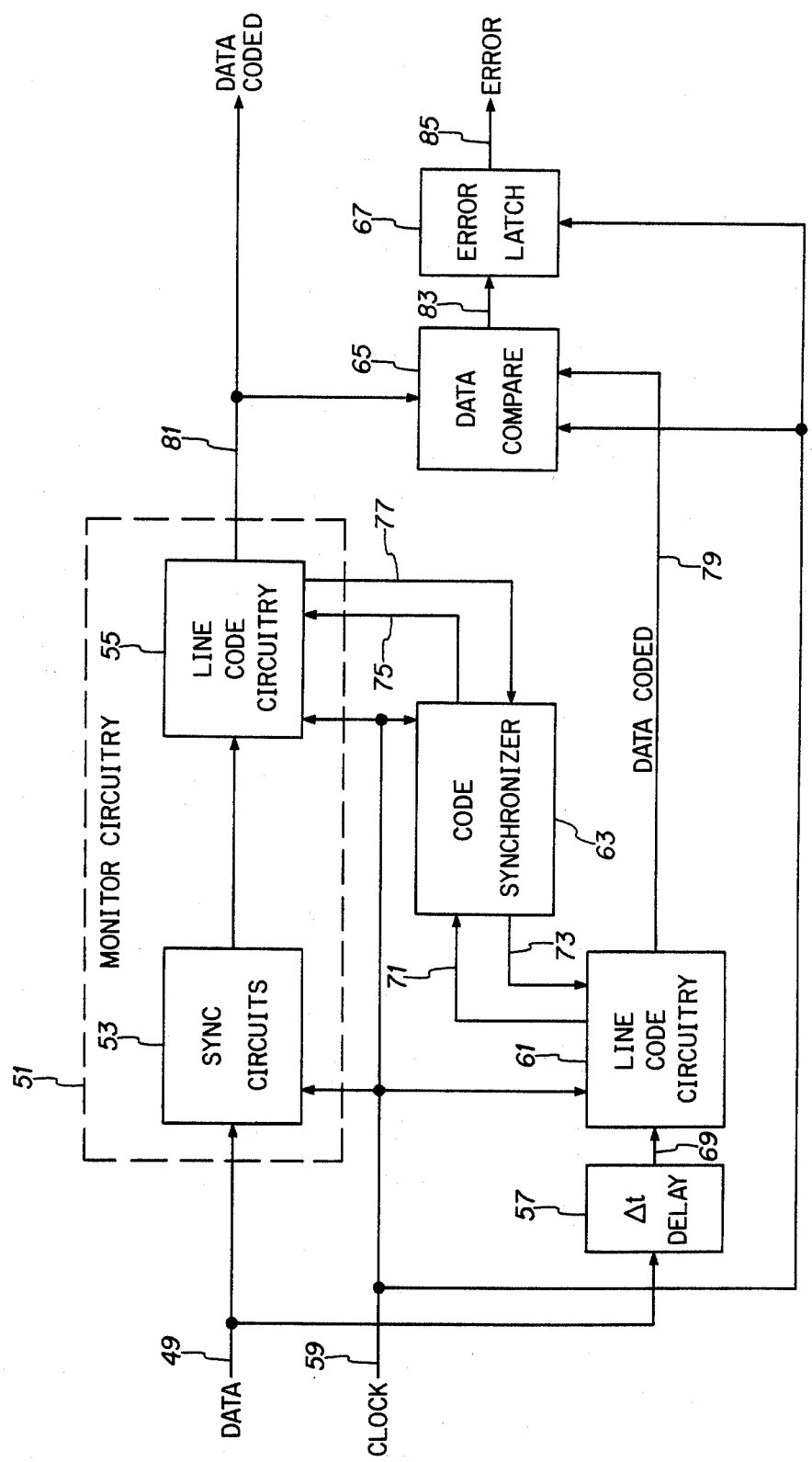
FIG. 2 is a functional block diagram of an alternate approach which may be used to solve the error checking problem mentioned above.

In FIG. 2 a data signal input lead for supplying nonreturn to zero data is designated as 49 and supplies data signals to a dash line block 51 containing a sync circuit block 53 and a line code circuit block 55. The data line 49 is also supplied to a delta t delay block 57. A clock signal is supplied on a lead 59 to the blocks 53, 55 and also to a line code block 61, a code synchronizer block 63, a data compare block or comparator 65 and an error latch 67. The data input from lead 49 to delay block 57 is output after a predetermined time period on a lead 69 to the line code circuit block 61. Synchronizing information is output from block 61 on a lead 71 to code synchronizer 63 and further synchronizing information is returned from block 63 to block 61 on a lead 73. Similar leads provide information between blocks 63 and 55 and are labeled 75 and 77, respectively. A coded data output from block 61 is supplied on a lead 79 to the data compare block 65. Apparatus coded data is output from block 55 on a lead 81 which is also supplied to data compare block 65. When the data does not compare, an error indication is supplied on lead 83 from block 65 to error latch 67. The latch 67 then continues the error indication after the signal on lead 83 disappears via a latched output lead 85.

In FIG. 3 nonreturn to zero data is input on a lead 100 to a dash line block or monitor circuit 102 containing a sync circuit block 104 and a line code circuit block 106. This data input on lead 100 is also supplied to a delta t delay block 108 for delaying the time of the data before it is output on lead 110 to a line code detector block 112. A clock signal is supplied on a clock input lead 114 to the blocks 104 and 106 and the monitor circuit 102 as well as being supplied to blocks 108 and 112, a data compare circuit block 116 and an error latch block 118. Encoded data is output from block 106 on a lead 120 as bipolar data dependent coded information and is also input to the data compare block 116. A code enable signal lead 122 supplies a signal indicative of the detection of a predetermined condition from block 106 to data compare 116 and a similar lead 124 supplies the same signals from detector 112 to data compare 116. The delayed data is then supplied from code detector 112 to data compare 116 on a lead 126. When an error is detected either in the data or in the code enable signals being supplied to data compare block 116, it is output on lead 128 to the error latch 118 and a latched error output signal is supplied from block 118 on lead 130.

In FIG. 4 waveforms a, b, c and d illustrate time periods from 1 through 17 of the clock waveform a with the associated binary input data to FIG. 3. The resulting output data depends upon whether the bipolar rule determined that the last violation of the rule was an odd or negative polarity pulse, in which event the output would be waveform c or if it was even or positive, the output would be represented by waveform d.

In FIG. 5 nonreturn to zero data is input on lead 150 to a flip-flop 152 having a clock input on lead 154. A set of further flip-flops 156, 158, 160, 162 and 164 are connected as shown to provide a time delay network of flip-flops each receiving their input signal from the previous stage. Although not shown, the clock lead 154 is connected to actuate many of the components in FIG. 5. The outputs of the flip-flops are supplied on a set of leads 166 through 174 to a set of NOR gates 176, 178 and 180. The outputs of these NOR gates 176 through 180 are supplied on a lead 181 to an interfacing and time delaying flip-flop 182 which supplies output signals both to an exclusive OR gate 184 via a lead 185 and to a NOR gate 186. The code enable signal shown by lead 122' supplies input signals to an interfacing flip-flop 188 which provides an output signal on lead 189 to a further input of the exclusive OR gate 184. The lead 174 from flip-flop 164 supplies signals to an inverting circuit 190 and to an exclusive OR gate 192. The output of 190 is supplied on a lead 193 to a NOR gate 194 which receives a second input from the exclusive OR gate 184. The output of flip-flop 182, as well as the output from 192, are supplied to the NOR gate 186. Lead 120' is used to represent the data obtained from the monitor circuit. This data is supplied through an interfacing and one bit time delaying flip-flop 196 and then supplied on a line 197, as a second input to exclusive OR gate 192. The output of the two NOR gates 186 and 194 are supplied on a common lead 198 to a latching flip-flop 200 which provides an error output signal on an apparatus output lead 130'.

FIGS. 6 through 9 each have timing clock waveforms labeled 154' to illustrate the fact that this is representative of the signal appearing on lead 154 of FIG. 5. The specific clock cycles are labeled 0 through 13 for later convenience in describing the actions of the components and their associated waveforms in other portions of the figure. Each of the remaining waveforms in these figures are designated with a ' (prime) to differentiate them from, yet link them to, the corresponding portions of FIG. 5.

OPERATION

Lines that carry data to and from transmission equipment normally contain coding (encoding) which generate specific line statistics. The coded lines provide energy for the clock extraction circuits while keeping a zero DC offset in the line. Thus, the data on the lines have a coding which is data dependent. In other words, the codes that are inserted are generated only for specific data patterns. One example of this type of code is the B3ZS (binary three zero substitution) code. This type of code is well known in the transmission industry and, simply stated, involves the insertion of a specific code in place of any three consecutive zeros which occur in the original data. The code is detected at the receive end and the transmitted code is replaced at the receive end by the three zeros.

The end result of this type of coding is that the data transmitted can be considered random and thus, there will be a zero DC offset in the line.

There is always the possibility that the circuit that is monitoring the data to be transmitted, and that is coding the line, is making errors in the translation process. Thus, some type of checking circuit must be utilized to see whether or not the monitor circuit is introducing errors into the supposedly correctly coded output data.

A prior art solution is shown in FIG. 1 where data is clocked into the sync circuit 14 as well as into a time delay circuit 18. The output of the sync circuit 14 is sent to a line encoder 16 for coding and transmission. The output data is then decoded in block 22 so as to recreate the original data input on line 10. Block 24 provides an error output on lead 34 whenever the delayed data from block 18 and the decoded data from block 22 do not coincide. The circuitry for decoding the output data is more complicated than the circuitry for encoding the data in the first place, as contained in block 16. Thus, a large number of parts are involved in the prior art solution of FIG. 1. The large amount of circuitry not only is a financial factor but increases the probability of failure due to the larger number of components.

FIG. 2 illustrates another possible approach to solving the problem of checking the monitor circuit for encoding errors, although, to the Applicant's knowledge, such an approach has not been tried since it also requires a large amount of circuitry to provide the checking function. The concept of FIG. 2, as indicated briefly previously, is that the encoding circuitry of block 55 would be duplicated in block 61 after the data is delayed to compensate for the delay in sync circuit 53, and the output of the two encoding circuits 55 and 61 be compared in comparator 65. The problem with the approach of FIG. 2 is that the circuitry for the code synchronizer 63 can be very complex and the total circuitry for providing the checking can even exceed that required to implement the approach of FIG. 1.

Before explaining the operation and theory behind the block diagram of FIG. 3, it should be first mentioned that the encoding portion of block 106 forms a major part of the circuitry of block 106. Further, the encoding circuitry is not activated unless a situation of three consecutive logic zeros is detected. Thus, the data output by block 106 is normally and essentially a B3ZS version of the nonreturn to zero input data. The concept of the present invention, therefore, is merely to detect whether or not three consecutive logic zeros are supplied with code detector 112 and to also, in normal operation, merely convert the nonreturn to zero input data to B3ZS data. The data compare circuit 116 thus, normally compares the output data from blocks 106 and 112 to make sure that the NRZ data supplied by each detector is identical. Block 116 also checks to make sure that the lines 122 and 124 are both indicating that, in normal situations, the detector has not detected the occurrence of three consecutive logic zero bits. However, when such a situation is encountered, the data compare circuit 116 does require that the indication be supplied on both lines 122 and 124 and at this time, the NRZ data is ignored for the purpose of generating error signals. Thus, the present invention operates such that through the combination of blocks 108, 112 and 116, it is normally comparing the input and output signals for identical logic value representations when there are less than three consecutive input data bits of a given logic value and alternately checking to see if the code enable signal has been properly generated by block 106 on line 122 when there are three consecutive data bits in the input signal having that given logic value.

The very large decrease in components required to implement the block diagram of FIG. 3 over that required to implement the block diagrams of FIGS. 1 and 2, allows for a significant decrease in circuit component numbers. This equates to lower cost, lower power dissipation and increased equipment reliability. Although not part of the inventive concept (and not shown), the implementation of FIG. 3 also allows the main circuit path of block 102 to correct for parity with minimal effect on the test pattern.

As indicated previously, waveform a of FIG. 4 represents the clock input 114 of FIG. 3, while waveform b represents the data input on lead 100. When using the widely recognized B3ZS format, each block of three consecutive zeros is removed and replaced by BOV or OOV where B represents a pulse conforming with the bipolar rule and V represents a pulse violating the bipolar rule. The choice of BOV or OOV is made so that the number of B pulses between consecutive V pulses is odd. The example illustrated in FIG. 4, is an example of B3ZS coding assuming the polarity of the last pulse transmitted to be negative or minus. If the last pulse transmitted had been plus or positive, then the resulting bipolar signals in waveforms c and d of FIG. 4 would have been the inverse of the examples shown here. Waveform c of FIG. 4 assumes that an odd number of pulses had been transmitted since the last bipolar violation. Figure d is the output waveform that would be provided if an even number of pulses had been transmitted since the last bipolar violation. Such coding, of course, is well known to those skilled in the art and is merely presented here for a more complete edification of the uninitiated. If more information is required, Technical Advisory 34 by AT & T published in the year, October, 1979, may be consulted.

The circuitry of FIG. 5 performs the functions of delay 108, line code detector 112, error latch 118 and the data compare function of block 116 of FIG. 3.

Figure 6:
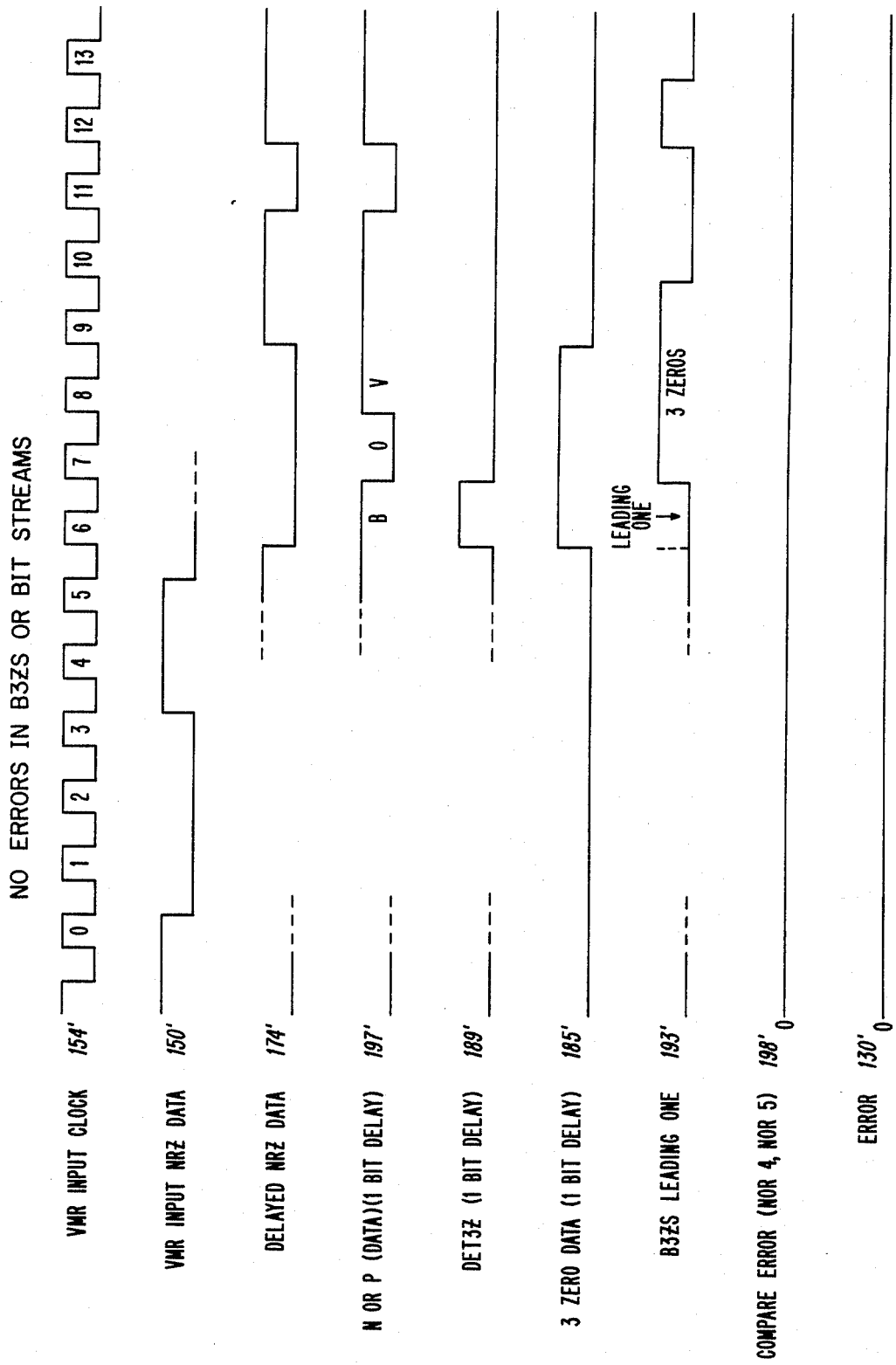

Reference should be made to the timing diagram of FIG. 6 in following the present explanation. FIG. 6 provides a representation of the waveforms that would occur if there are no errors in the B3ZS encoding or data bit streams. As illustrated, the data coming in contains three consecutive logic zeros from time periods 1 through 3 on waveform 154'. The NOR gates 176, 178 and 180 will, in consecutive time periods 5, 6 and 7, produce the output pulses indicating that all three inputs are logic zero. These three logic ones are passed through the flip-flop 182 to provide the output shown as waveform 185' delayed by one bit and accordingly occurring in time periods 6, 7 and 8. The code enable signal from line code circuitry 106 is received on lead 122 and delayed in flip-flop 188 such that it appears at the beginning of time period 6, as shown in FIG. 6 for waveform 189'. The exclusive OR gate 184 (actually operates as an ENOR) provides an error if the two inputs are not the same at the appropriate time period. This error is passed through NOR 194 when enabled by a logic zero from 190 via 193. The logic one output at time period 6 from gate 184 prevents the passage of any signal by NOR gate 194 to the output during the time the three consecutive logic zeros condition does not persist. No bits can be passed by gate 186 when a logic one is on lead 185. Error messages cannot be passed through 186 during a period of three consecutive zeroes.

Figure 7:
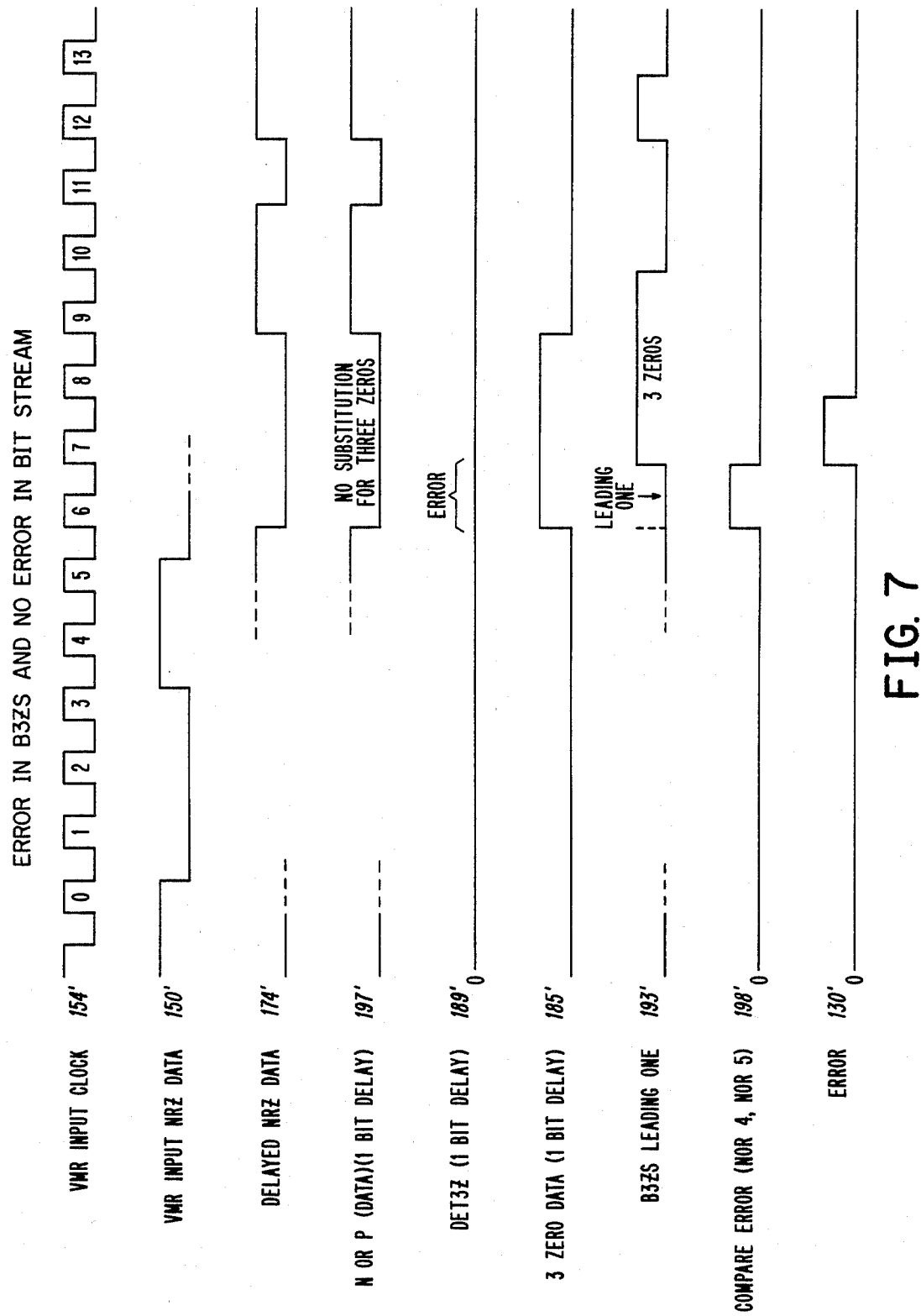

The waveforms of FIG. 7 assume that there is an error in the B3ZS detection as illustrated, there being no detection of the occurrence of three consecutive zeros on incoming line 122' and thus, no substitution in the data as was shown in FIG. 6. Since the signal on lead 189 is a logic zero rather than a logic one at the time of detection of the three zero data by the NOR gates 176 through 180, two logic zeros are applied to NOR gate 194 and a code compare error is generated on lead 198 at time period 6 resulting in an error output from latch 200 at time period 7.

Figure 8:
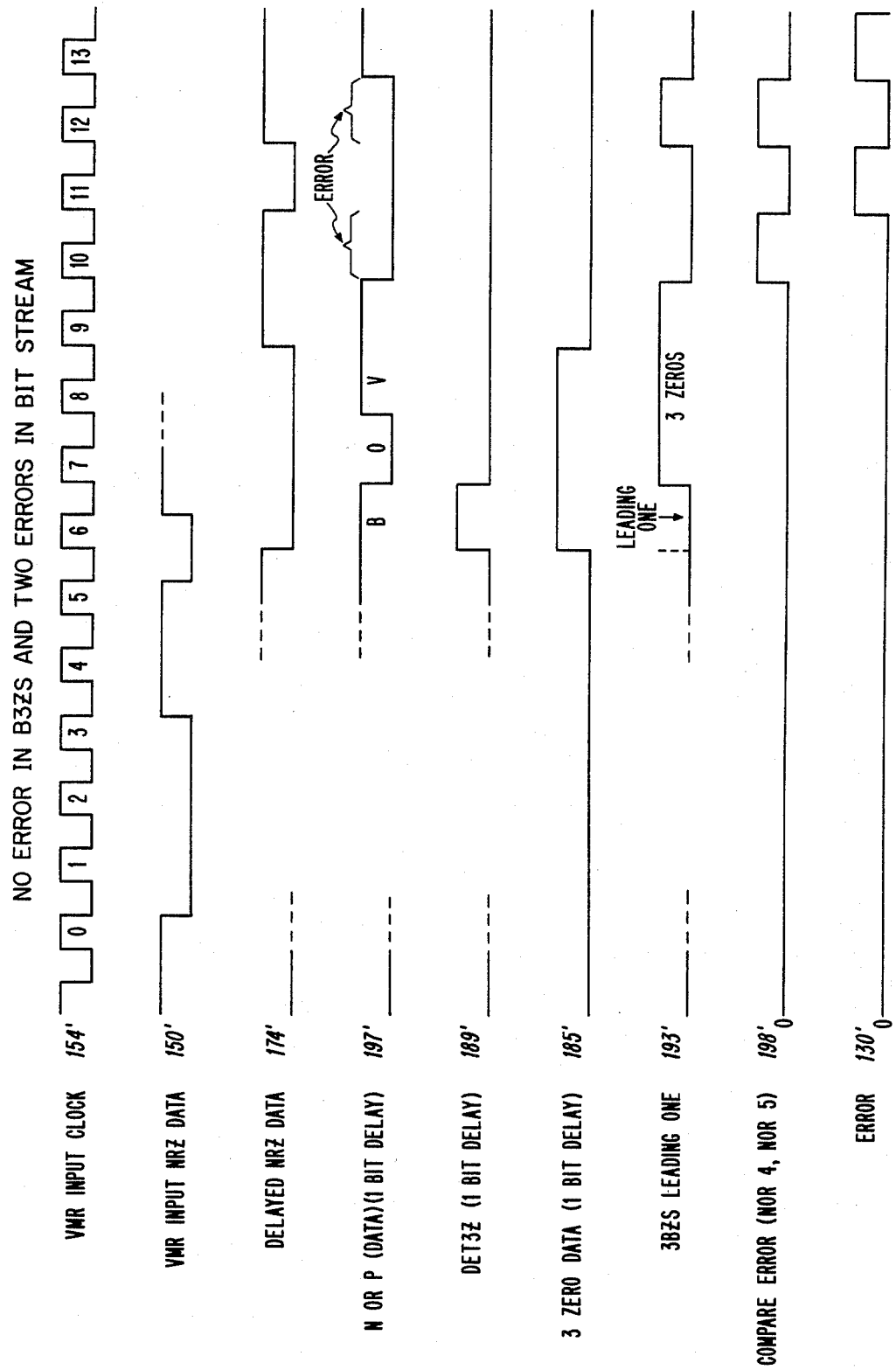

The waveforms of FIG. 8 assume no error in the detection of binary three zero data but does assume there are two errors in the bit stream arriving on lead 120', as compared with the data being received on lead 150. Thus, the data commencing with time period 10 does not coincide with the data appearing on lead 174 after being delayed through the flip-flops 152 through 164. Thus, the exclusive OR (actually operates as an ENOR) gate 192 produces a logic zero and the NOR gate 186 produces a logic one output for time periods 10 and 12 when the two sets of data do not coincide, thereby producing outputs from flip-flop 200 at time periods 11 and 13.

Figure 9:
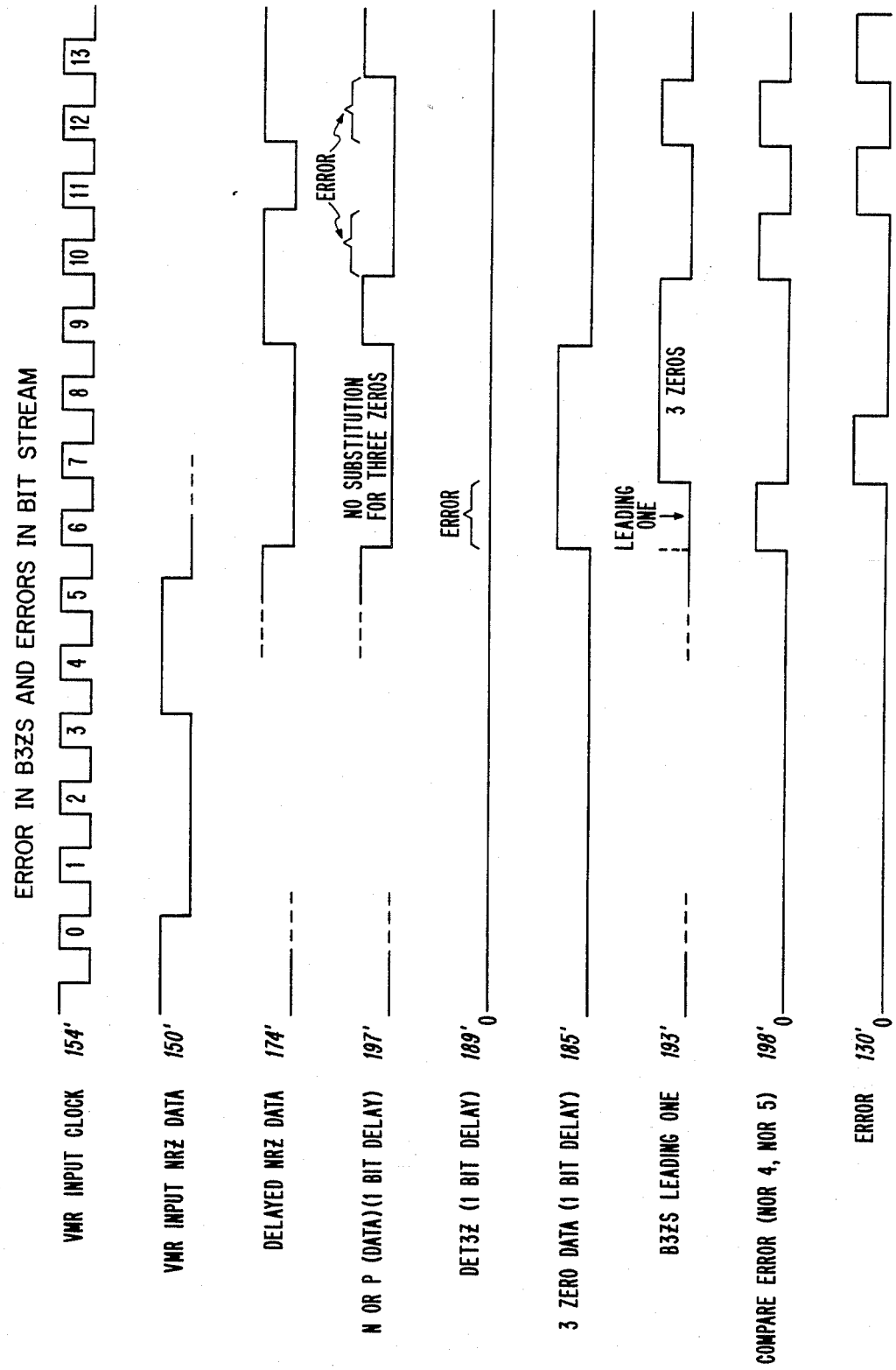

The timing diagram of FIG. 9 assumes that there is an error both in the B3ZS detection and also errors in the bit stream arriving on lead 120 from the line code circuitry 106 of FIG. 3. Thus, following through the previous bit paths for FIGS. 6, 7 and 8, it will be observed that errors are detected by NOR gates 194 and 186 at time periods 6, 10 and 12, as shown, and output by flip-flop 200 one time period later.

Although a specific implementation has been illustrated on how the data compare function of block 116 in FIG. 3 may be implemented, the invention is not limited to the specific implementation. Rather, the invention is limited only by the concept that data which is occasionally especially processed due to a reasonably unusual set of circumstances, can be checked for validity by a simple detection circuit which detects the normal situation, and in these situations, compares data directly, and in the special situations, detects the occurrence of the special situation and makes sure that the signal processing circuitry has also detected this special situation. If both the checking circuit and the main circuit detect a special situation at the same time, it is reasonable to assume that everything is working properly. Since the checking circuitry for this type of algorithm is very simple, as compared to the circuitry doing all of the special processing, a considerable amount of savings results as referenced above.

In view of this, we wish to be limited not by the specific embodiment illustrated but only by the scope of the appended claims wherein we claim:

1. The method of error detecting data dependent coded data comprising the steps of:
   normally outputting an encoded data stream unaltered in logic value representation as compared to an input data stream when there are less than a predetermined number of consecutive logic bits of a given logic value;

adding logic value data depending output signals to the data stream when a predetermined set of logic bit conditions exists and simultaneously providing a code enable signal indicative of said adding;

normally checking encoded output data with input data for identical logic values at both locations when said input data has less than said number of consecutive data bits of a given logic value and outputting an error signal during the normal checking conditions when identical logic values are found not to occur; and alternatively checking whether or not said code enable has been provided when said input data has said predetermined set of logic bit conditions and providing an error signal at times when the predetermined set of conditions is detected and the code enable signal is not being detected.

2. The method of checking for errors generated in a data encoding system of the type which generates DS3 (digital signal third level) bipolar output B3ZS (binary three zero substitution) output data and an accompanying code enable signal signifying the occurrence of B3ZS from binary input data comprising the steps of:

checking input data to see if there are three consecutive data bits having an identical given logic value;

normally comparing input and output signals for identical logic value representations when there are less than three consecutive input data bits of said given logic value and generating an output error signal if the comparing shows non-identity; and alternately checking to see if the code enable signal has been generated if there are three consecutive data bits in the input signal having said given logic value and generating an output error signal if no code enable signal is detected.

3. Apparatus for generating encoded data and for checking to ascertain proper operation comprising, in combination;

apparatus input first means for supplying binary data having logic one and logic zero values;

apparatus output second means for supplying encoded output signals;

third means, connected between said first and second means, for encoding said binary input data to provide an encoded output signal at said output second means which normally is directly indicative of the input signal except for the times that the input signal contains more than a predetermined number of consecutive logic bits of a given logic value when special encoding is performed to ensure proper operation of downstream equipment and for outputting an accompanying code enable signal which code enable signal signifies the occurrence of the special encoding in the output data stream; and fourth means connected to said first means, said second means and said third means (1) for normally comparing the input and encoded output signals for identity of logic representative values when no more than a predetermined number of consecutive logic bits of a given logic value have been received from said input first means and generating an error signal when there is no such identity and (2) for checking to see if a code enable signal is received from said third means when the binary input from said first means remains at said given logic value for greater than said predetermined number of consecutive data bits and generating an error signal if the code enable signal is not received.

4. Apparatus as claimed in claim 3 wherein:

the special encoding used by said third means has the format of digital signal third level bipolar output binary three zero substitution; and said fourth means checks to make sure that said code enable signal is not output by said third means when no more than a predetermined number of consecutive logic bits of a given logic value have been received from said input first means.

5. Apparatus for checking operation of line signal detecting and processing circuitry comprising, in combination:

apparatus input first means for supplying binary data having logic one and logic zero values;

apparatus output second means for supplying encoded output signals;

line processing third means, connected between said first and second means, for processing said binary input data to provide an output signal at said output second means except for the times that the input signal contains a combination of logic bits whereby special encoding is required to ensure proper operation of downstream equipment and to provide an accompanying code enable signal which code enable signal signifies the occurrence of the special encoding in the output data stream;

special encoding fourth means, connected to said second and third means for providing said special encoding;

monitor fifth means, connected to said first means and including an output means, for processing said binary input data in a manner substantially identical to said third means to provide an output signal at said output means thereof except for the times that the input signal contains a combination of logic bits whereby special encoding is required to ensure proper operation of downstream equipment and to provide an accompanying code enable signal which code enable signal signifies the occurrence of the special encoding in the output data stream;

comparison sixth means, connected to said third, fourth and fifth means, for checking that the logic value of the data output by both said third and fifth is identical except when said special encoding is required and for checking that the logic values of said code enable signals are identical; and error signal output seventh means, connected to said sixth means for providing an output signal when either check indicates nonidentity.

* * * * *